(12) United States Patent
Yamashita

(10) Patent No.: US 7,811,010 B2
(45) Date of Patent: Oct. 12, 2010

(54) CAMERA APPARATUS WITH POSITIONING TUBE AND MOUNTING BASE

(75) Inventor: Tatsumaro Yamashita, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 259 days.

(21) Appl. No.: 11/862,615

(22) Filed: Sep. 27, 2007

(65) Prior Publication Data

US 2008/0075442 A1 Mar. 27, 2008

(30) Foreign Application Priority Data

Sep. 27, 2006 (JP) ............................. 2006-262535

(51) Int. Cl.
*G03B 17/00* (2006.01)
*H04N 7/18* (2006.01)
(52) U.S. Cl. ..................... 396/427; 396/535; 348/143; 348/148
(58) Field of Classification Search ................ 348/143, 348/148, 151; 396/25, 427, 419
See application file for complete search history.

(56) References Cited

U.S. PATENT DOCUMENTS

| 5,240,220 | A | * | 8/1993 | Elberbaum | .................. | 248/558 |
| 6,100,921 | A | * | 8/2000 | Rowley | ...................... | 348/81 |
| 6,507,700 | B1 | * | 1/2003 | Takekuma et al. | ............ | 396/25 |
| 7,549,808 | B2 | * | 6/2009 | Sakigawara et al. | ......... | 396/427 |
| 2003/0095800 | A1 | * | 5/2003 | Finizio et al. | ................ | 396/427 |
| 2004/0263623 | A1 | * | 12/2004 | Arbuckle | ..................... | 348/143 |
| 2005/0111222 | A1 | * | 5/2005 | Olsson et al. | ................ | 362/267 |

FOREIGN PATENT DOCUMENTS

| JP | 2004-182040 | | 7/2004 |
| JP | 2004182040 A | * | 7/2004 |
| JP | 2006-044514 | | 2/2006 |

* cited by examiner

*Primary Examiner*—Melissa J Koval
*Assistant Examiner*—Leon W Rhodes
(74) *Attorney, Agent, or Firm*—Brinks Hofer Gilson & Lione

(57) ABSTRACT

A small-diameter positioning tube is formed in an external wall surface of a housing (upper case and lower case) that is a constructional element of a camera body via a stepped part. When the camera body is attached to a mounting base using screws, a positioning tube is fitted into an opening, and the stepped part is caused to abut on an outer peripheral edge of an upper surface of the opening. In this state, the screws are fastened so that the fastening force of the screws can be received by an abutting part between the stepped part and the opening. If the invention is constructed in this way, the fastening force of the screws does not directly act on the lens holding member that is received and fixed inside the housing, even if the camera body is firmly attached to the mounting base by the fastening force of the screws, any distortion caused in the lens holding member or a lens can be relieved.

5 Claims, 5 Drawing Sheets

CAMERA APPARATUS WITH POSITIONING TUBE AND MOUNTING BASE

CLAIM OF PRIORITY

This application claims benefit of the Japanese Patent Application No. 2006-262535 filed on Sep. 27, 2006, which is hereby incorporated by reference.

BACKGROUND

1. Field of the Invention

The present invention relates to a camera apparatus suitably built in an outer mirror device for a vehicle, etc.

2. Description of the Related Art

Conventionally, a technique is know of attaching a camera body into a mirror housing of an outer mirror device for a vehicle, and displaying an image picked up by the camera body on a monitor display disposed in an instrument panel, etc, thereby covering a dead area that cannot be visually recognized by a mirror (for example, refer to JP-A-2004-182040). Background Information.

FIG. 5 is an explanatory view showing a conventional camera apparatus disclosed in the above-referenced JP-A-2004-182040. This camera apparatus includes a mounting base 100 installed inside the mirror housing (not shown), a hollow housing 102 that is attached to the mounting base 100 by using a plurality of screws 101, and a lens holding member 103 fixedly fitted into the housing 102. A cylindrical supporting projection 100a is erected from the mounting base 100, and an opening 100b is bored in an internal bottom surface of a space surrounded by the supporting projection 100a. A flange 102a is formed so as to project from an external wall surface of the housing 102, and each of the screws 101 is inserted through the flange 102a and screwed to the supporting projection 100a. A lens 104 is held inside the lens holding member 103. The housings 102 and the lens holding member 103 constitute a camera body 105. The lens holding member 103 is formed with a stepped part 103a that abuts on an outer edge of the opening 100b. A distal small-diameter portion that continues via the stepped part 103a becomes a positioning tube 103b. Also, the camera body 105 (the housing 102 and the lens holding member 103) is positioned in the radial direction with respect to the mounting base 100 by fitting the positioning tube 103b into the opening 100b.

In this conventional camera apparatus, when each of the screws 101 is fastened with the positioning tube 103b fitted into the opening 100b, the stepped part 103a is brought into close contact with an outer edge of an upper surface of the opening 100b by a fastening force. Thus, the camera body 105 can be attached to the mounting base 100 with high positional accuracy without chattering. However, the fastening force of the screws 101 acts on an abutting part between the outer edge of the upper surface of the opening 100b, and the stepped part 103a. Therefore, when an attempt is made to firmly attach the camera body 105, a problem exist in that distortion occurs in the lens holding member 103 or the lens 104 by the fastening force of the screws 101.

BRIEF SUMMARY

A camera apparatus is disclosed including: a tubular lens holding member that holds a lens inside; a housing that receives and fixes the lens holding member; and a mounting base provided with an opening that exposes the lens, and having the housing attached to the mounting base using fastening fittings. A small-diameter positioning tube is formed in an external wall surface of the housing via a stepped part. The stepped part is caused to abut on an outer edge of the opening so that the fastening force from the fastening fittings may be received by the abutting part. The positioning tube is fitted into the opening of the mounting base.

In the camera apparatus constructed in this way, when fastening fittings including screws, etc. are fastened to attach the housing to the mounting base, the fastening force of the fastening fittings is received by the abutting part between the stepped part of the housing, and the outer edge of the opening. Thus, the fastening force will not directly act on the lens holding member that is received and fixed inside the housing. Therefore, any distortion caused in the lens holding member and the lens can be relieved.

In the above construction, if at least a part including the stepped part in the housing is partially thickened to form a thick wall part, and an inner peripheral surface of the thick wall part is caused to project more radially inward than the inner peripheral surface of the positioning tube, the mechanical strength in the vicinity of the stepped part on which the fastening force of the fastening fittings acts becomes high. Therefore, the distortion of the housing itself resulting from the fastening force of the fastening fittings also becomes small. As a result, the distortion of the lens holding member and the lens can be further relieved by that much.

DESCRIPTION OF THE EMBODIMENTS

Figure 1:
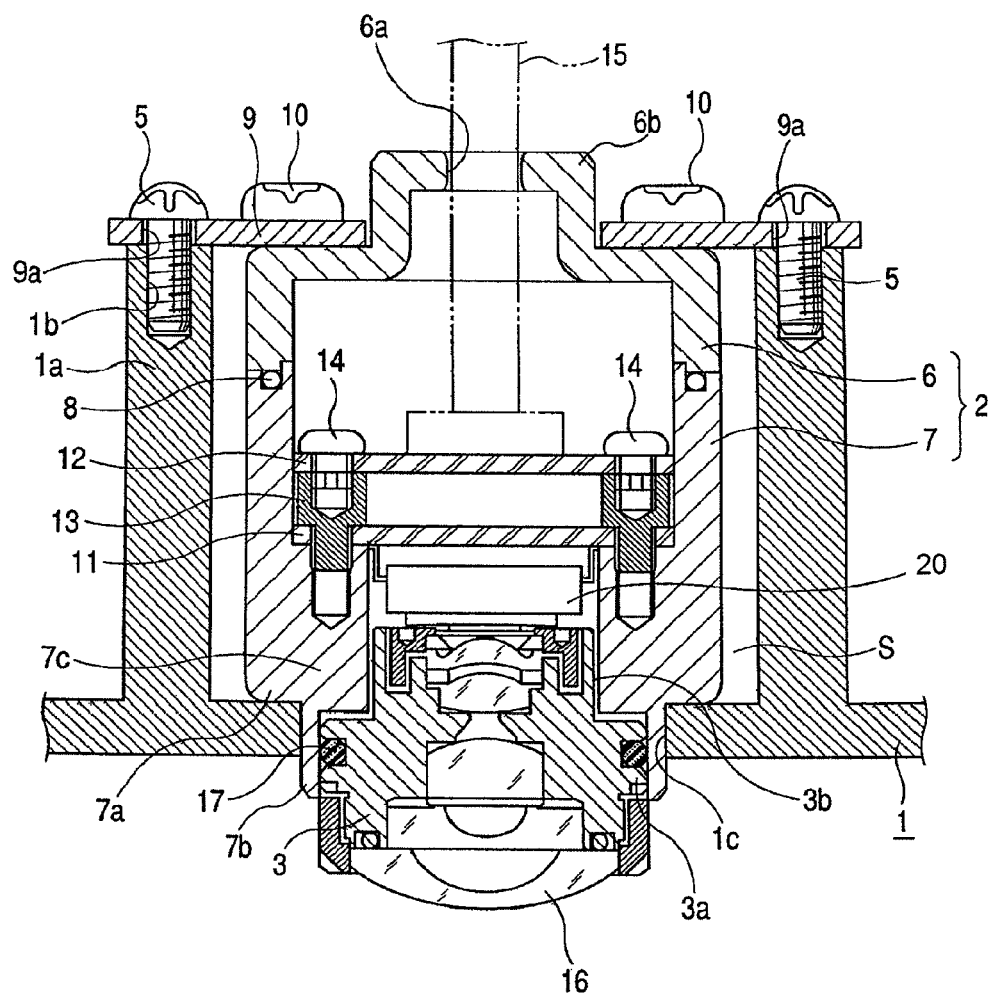
FIG. 1 is a sectional view of a camera apparatus according to an embodiment.
Figure 2:
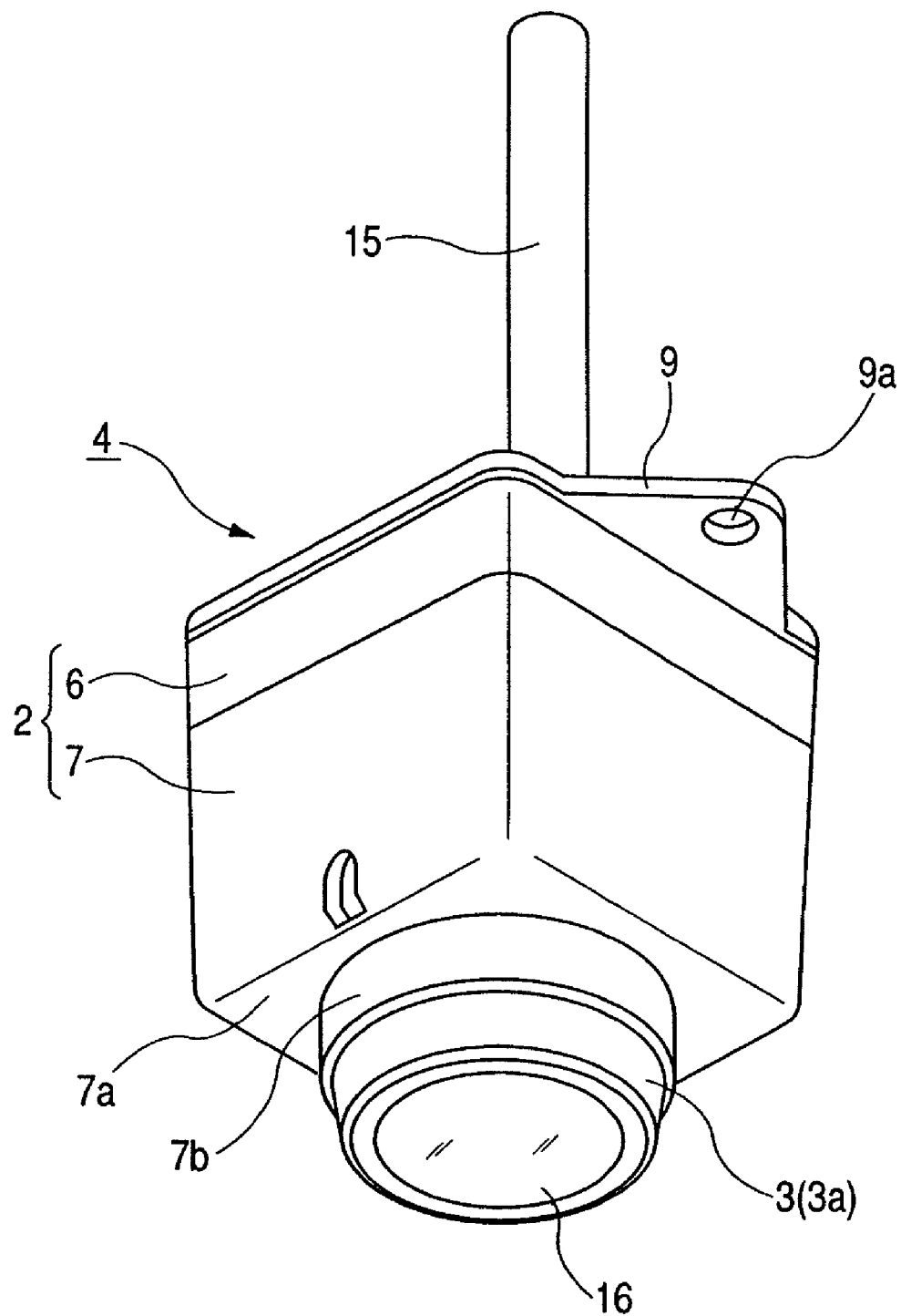
FIG. 2 is a perspective view of a camera body provided in the camera apparatus.
Figure 3:
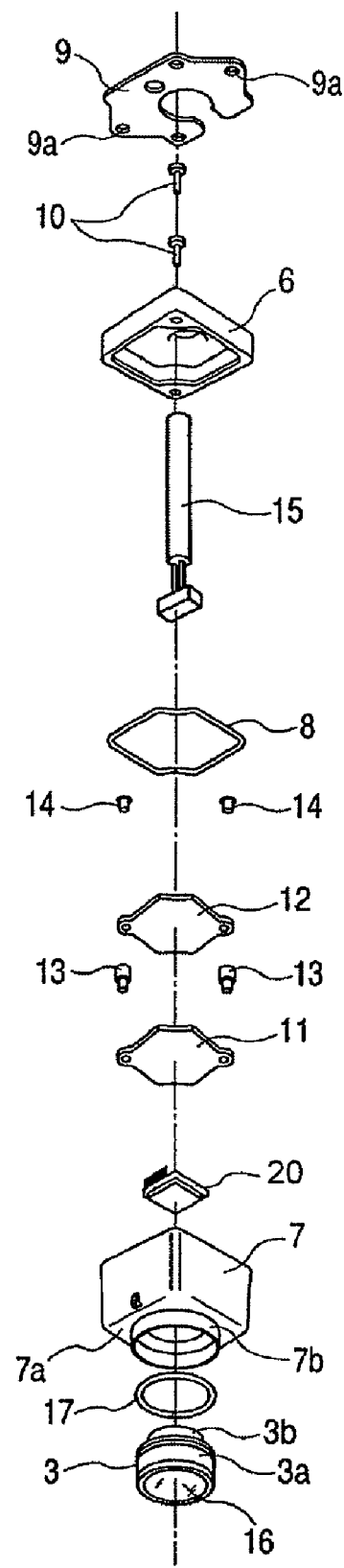
FIG. 3 is an exploded perspective view of the camera body.
Figure 4:
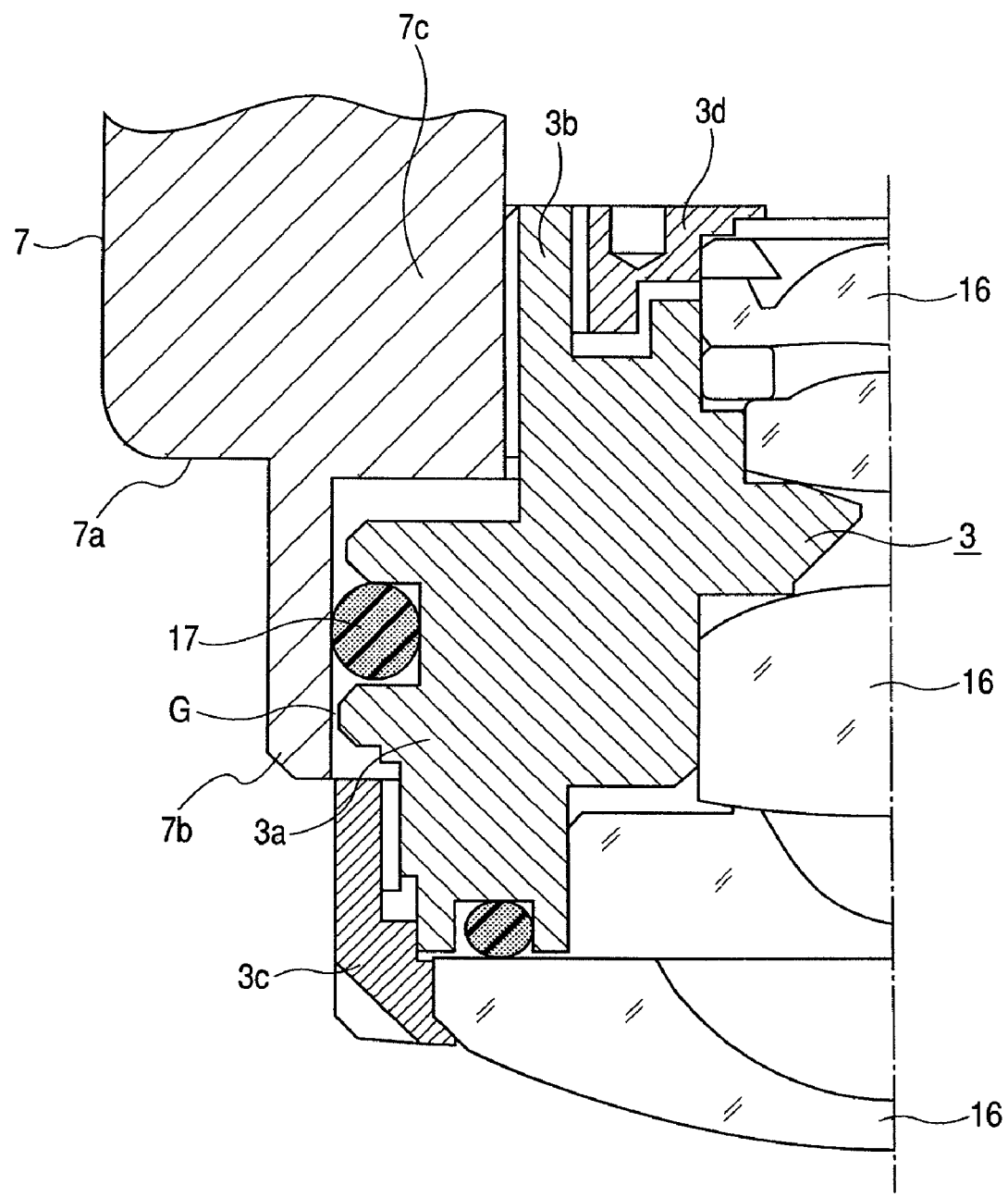
FIG. 4 is a sectional view showing principal parts of the camera apparatus in an enlarged manner.
Figure 5:
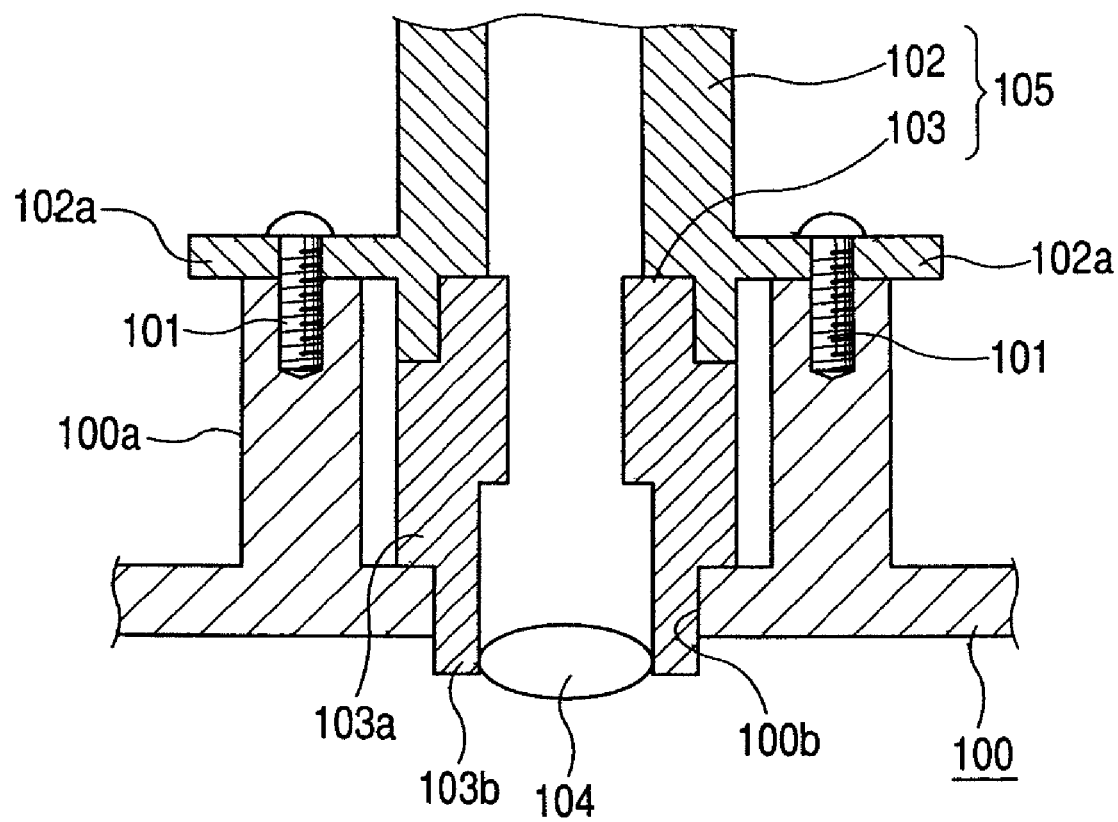
FIG. 5 is an explanatory view of a camera apparatus according to a conventional example.

Embodiments of the invention will be described with reference to the accompanying drawings. FIG. 1 is a sectional view of a camera apparatus according to an embodiment of the invention, FIG. 2 is a perspective view of a camera body provided in the camera apparatus, FIG. 3 is an exploded perspective view of the camera body, and FIG. 4 is a sectional view showing principal parts of the camera apparatus in an enlarged manner.

The camera apparatus according to this embodiment includes a mounting base 1 installed in a mirror housing (not shown), etc, and a camera body 4 that is constituted by a housing 2, a lens holding member 3, etc. Also, as will be described below, the camera body 4 is attached to the mounting base 1 using two screws 5 that are fastening fittings. A quadrangular tubular supporting projection 1a is erected from the mounting base 1, and two screw holes 1b are provided in an upper surface of the supporting projection 1a. A space S surrounded by the supporting projection 1a of the mounting base 1 becomes a storage space for the camera body 4, and the opening 1c having a circular shape in plan view is bored in an internal bottom surface of the space S.

The housing 2 includes half-split upper case 6 and lower case 7. Packing 8 is interposed in a joint surface between both the cases 6 and 7. A boss 6b that has a through hole 6a is formed so as to project from a central part of an upper surface of the upper case 6. A bracket 9 is disposed so as to surround the boss 6b. The bracket 9 is fixed to the upper surface of the upper case 6 using a pair of screws 10. Both of the screws 10 are inserted through the upper case 6 and screwed to the lower case 7 whereby both the cases 6 and 7 are joined and integrated together to constitute the hollow housing 2. As shown in FIG. 2, the housing 2 assumes a prism-shaped appearance. Mounting holes 9a are respectively formed at both ends of the bracket 9 that project from the upper case 6.

A small-diameter positioning tube 7b is formed at a lower end of the lower case 7 via a stepped part 7a. As the stepped part 7a abuts on a peripheral edge of an upper surface of the opening 1c, the position (of the housing 2 in its height direction vertical direction of FIG. 1) with respect to the mounting base 1 is prescribed. Further, the external diameter of the positioning tube 7b is set to be approximately equal to the internal diameter of the opening 1c, and as the positioning tube 7b is fitted into the opening 1c, the position of the housing 2 in its radial direction (horizontal direction of FIG. 1) with respect to the mounting base 1 is prescribed. The lower case 7 has a thick wall part 7c from the inside of the stepped part 7a to an upper central part. An inner peripheral surface of the thick wall part 7c projects more radially inward than the inner peripheral surface of the positioning tube 7b. That is, the internal diameter of the thick wall part 7c is set to be smaller than the internal diameter of the positioning tube 7b.

A lower board 11 that mounts a CCD (solid-state image sensing device) 20, and an upper board 12 that mounts a control circuit (not shown) are disposed inside the housing 2. The lower board 11 is screwed to the upper surface of the thick wall part 7c of the lower case 7 using two struts 13, and the upper board 12 is fixed onto both the struts 13 using two screws 14. Further, wire harness 15 is connected to the upper board 12 using a connector, and the wire harness 15 is led to the outside of the housing 2 through the through hole 6a of the upper case 6.

The lens holding member 3 is a stepped lens barrel that has a large-diameter lens holding part 3a and a small-diameter lens holding part 3b. As an outer peripheral surface of the small-diameter lens holding part 3b is screwed to an inner peripheral surface of the thick wall part 7c, the lens holding member 3 is fixedly stored inside the lower case 7. A plurality of combination lenses 16 with different diameters are held by the lens holding member 3. Among the combination lenses 16, a relatively large-diameter lens 16 is held inside the large-diameter lens holding part 3a, and is prevented from coming off by a lower ring 3c, and a small-diameter lens 16 is held inside the small-diameter lens holding part 3b, and is prevented from coming off by an upper ring 3d. A waterproof ring 17 including elastic rubber is wound around an outer peripheral surface of the large-diameter lens holding part 3a. The large-diameter lens holding part 3a projects downward from the inside of the positioning tube 7b of the lower case 7. As shown in FIG. 4, the gap G is secured between the outer peripheral surface of the large-diameter lens holding part 3a and the inner peripheral surface of the positioning tube 7b, and the waterproof ring 17 is brought into pressure contact with the inner peripheral surface of the positioning tube 7b inside the gap G so that liquid, such as water, may not enter the lens holding member 3 through the gap G.

When the camera body 4 constructed as describe above is attached to the mounting base 1, first, the camera body 4 is inserted into the space S surrounded by the supporting projection 1a of the mounting base 1, and the positioning tube 7b of the lower case 7 that is a constructional member of the housing 2 is fitted into the opening 1c, and the stepped part 7a of the lower case 7 is made to abut on the outer peripheral edge of the upper surface of the opening 1c. This will cause the camera body 4 including the housing 2 to be positioned in the radial direction of the mounting base 1 (horizontal direction of FIG. 1), and will cause the camera body 4 to be positioned in the height direction (vertical direction of FIG. 1) of the mounting base 1. Thereafter, if the mounting holes 9a of the bracket 9 integrated with the housing 2 are caused to coincide with the corresponding screw holes 1b of the supporting projection 1a, and in this state, the screws 5 inserted into the mounting holes 9a are screwed and fastened to the screw holes 1b, the stepped part 7a of the lower case 7 is brought into close contact with the outer edge of the upper surface of the opening 1c by the fastening force of the screws. Therefore, the camera body 4 can be firmly attached to the mounting base 1 without chattering while high positional accuracy is maintained.

At this time, the fastening forces of the screws 5 are received by an abutting part between the stepped part 7a of the lower case 7 that is a constructional component of the housing 2 and the outer edge of the upper surface of the opening 1c, and the fastening forces do not directly act on the lens holding member 3 that is stored and fixed inside the housing 2. Thus, any distortion caused in the lens holding member 3 or the lens 16 can be relieved. Moreover, a part including the stepped part 7a of the lower case 7 is formed as the thick wall part 7c that is partially thickened, and the inner peripheral surface of the thick wall part 7c is caused to project more radially inward than the inner peripheral surface of the positioning tube 7b. Thus, the mechanical strength in the vicinity of the stepped part 7a on which the fastening force of the screws 5 acts becomes high. Thus, the distortion of the housing 2 itself resulting from the fastening force of the screws 5 also becomes small. As a result, the distortion of the lens holding member 3 and the lens 16 can be further relieved. Further, the lens holding member 3 preferably has the large-diameter lens holding part 3a and the small-diameter lens holding part 3b that are different in diameter. Also, the large-diameter lens holding part 3a is caused to project outward from the inside of the positioning tube 7b, and the outer peripheral surface of the small-diameter lens holding part 3b is screwed and fixed to the inner peripheral surface of the thick wall part 7c. Thus, the small-diameter lens holding part 3b of the lens holding member 3 is disposed inside the thick wall part 7c. As a result, the mechanical strength in the vicinity of the stepped part 7a can be increased by the thick wall part 7c formed in the housing 2, and the whole camera apparatus can be miniaturized in the radial direction. Moreover, the gap G is secured between the outer peripheral surface of the large-diameter lens holding part 3a and the inner peripheral surface of the positioning tube 7b, and the waterproof ring 17 that comes into elastic contact with the large-diameter lens holding part 3a and the positioning tube 7b is interposed in the gap G. Thus, even if the tube 7b is distorted a little by the fastening force of the screws 5, the distortion can be absorbed by the gap G without transmitting the distortion to the large-diameter lens holding part 3a. Also, the waterproof ring 17 can prevent liquid, such as water, from entering the lens holding member 3 through the gap G.

The invention claimed is:

1. A camera apparatus comprising:
    a tubular lens holding member that holds a lens;
    a housing that receives and fixes the lens holding member; and
    a mounting base provided with an opening that exposes the lens;
    fastening fittings that attach the housing to the mounting base;
    wherein the housing does not hold any lens and a small-diameter positioning tube is formed in an external wall surface of the housing via a stepped part, and the stepped part of the housing abuts an inner peripheral surface of the mounting base so that the fastening force from the fastening fittings may be received by the inner peripheral surface, and wherein the positioning tube is fitted into the opening of the mounting base.

2. The camera apparatus according to claim 1, wherein at least a part including the stepped part in the housing is partially thickened to form a thick wall part, and an inner peripheral surface of the thick wall part is caused to project more radially inward than the inner peripheral surface of the positioning tube.

3. The camera apparatus according to claim 2, wherein the lens holding member has a large-diameter lens holding part and a small-diameter lens holding part that holds a plurality of combination lenses that are different in diameter, and the large-diameter lens holding part projects radially outward from the inside of the positioning tube, and an outer peripheral surface of the small-diameter lens holding part is fixed to the inner peripheral surface of the thick wall part.

4. The camera apparatus according to claim 3, wherein a gap is secured between the inner peripheral surface of the positioning tube, and an outer peripheral surface of the large-diameter lens holding part.

5. The camera apparatus according to claim 4, wherein a waterproof ring including an elastic body is disposed inside the gap, and the waterproof ring is brought into elastic contact with the inner peripheral surface of the positioning tube, and the outer peripheral surface of the large-diameter lens holding part.

* * * * *